US008811913B2

(12) United States Patent
Hu et al.

(10) Patent No.: US 8,811,913 B2
(45) Date of Patent: Aug. 19, 2014

(54) RF CALIBRATION DATA MANAGEMENT IN PORTABLE DEVICE

(75) Inventors: Chien-Chih Hu, Taoyuan County (TW); Chin-Ming Fan, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 156 days.

(21) Appl. No.: 13/590,924

(22) Filed: Aug. 21, 2012

(65) Prior Publication Data

US 2013/0217348 A1    Aug. 22, 2013

Related U.S. Application Data

(60) Provisional application No. 61/601,286, filed on Feb. 21, 2012.

(51) Int. Cl.
*H04B 17/00* (2006.01)
*H04B 1/38* (2006.01)

(52) U.S. Cl.
USPC ........................ 455/67.14; 455/90.2

(58) Field of Classification Search
CPC .......................................... G06F 3/08
USPC .................. 455/67.14, 67.11, 423, 425, 63.3, 455/186.1, 90.1, 90.2
See application file for complete search history.

(56) References Cited

U.S. PATENT DOCUMENTS 7,123,649 B1 * 10/2006 Smith et al. .................... 375/222

* cited by examiner

*Primary Examiner* — Eugene Yun
(74) *Attorney, Agent, or Firm* — Birch, Stewart, Kolasch & Birch, LLP

(57) ABSTRACT

An embodiment of the invention provides an operation method for a portable device. The method comprises steps of mounting a first partition of a flash memory to an application processor, wherein a calibration data is stored in the first partition and the first partition is read only by the application processor; mounting a second partition of the flash memory to the application processor, wherein a radio data is stored in the second partition and the second partition can be read or written by the application processor; transmitting the calibration data and the radio data to a communication processor by the application processor; the communication processor operating according to the calibration data and the radio data.

16 Claims, 7 Drawing Sheets

RF CALIBRATION DATA MANAGEMENT IN PORTABLE DEVICE

CROSS REFERENCE TO RELATED APPLICATIONS

This application claims the benefit of U.S. Provisional Application No. 61/601,286, filed on Feb. 21, 2012, the entirety of which is incorporated by reference herein.

BACKGROUND OF THE INVENTION

1. Field of the Invention

The invention relates to a portable device, and especially to a RF calibration data management in the portable device.

2. Description of the Related Art

In recent years, portable devices, such as mobile phones, smart phones or personal digital assistants, have become ubiquitous and most people have become more and more dependent on portable devices in their the daily lives. Furthermore, more and more application programs for the portable devices are provided for user to increase the functionality of the portable devices. In the portable devices, some data should not be modified by the user to avoid the portable devices abnormal operation when users use the application programs.

BRIEF SUMMARY OF THE INVENTION

A method of radio frequency calibration management in a volatile memory communication modem system is disclosed. The present invention includes the calibration data management for a manufacturing tool, the write protection of calibration data in an operating system and compatibility for different radio images versions conversion.

An embodiment of the invention provides an operation method for a portable device. The method comprises steps of mounting a first partition of a flash memory to an application processor, wherein a calibration data is stored in the first partition and the first partition is read only by the application processor; mounting a second partition of the flash memory to the application processor, wherein a radio data is stored in the second partition and the second partition can be read or written by the application processor; transmitting the calibration data and the radio data to a communication processor by the application processor; the communication processor operating according to the calibration data and the radio data.

Another embodiment of the invention provides a portable device. The portable device comprises a flash memory, an application processor and a communication processor. The flash memory comprises a first partition and a second partition, wherein a calibration data is stored in the first partition and a radio data is stored in the second partition. The application processor coupled to the flash memory and the flash memory can be only accessed by the application processor. The communication processor is connected to the application processor via a first interface to deal with tasks or procedures related to wireless communication for the portable device. When the portable device is turned on, the first partition and the second partition are mounted to the application processor, the first partition is read only by the application processor, the second partition can be read or written by the application processor, the application processor transmits the calibration data and the radio data to the communication processor via the first interface, and the communication processor operates according to the calibration data and the radio data.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
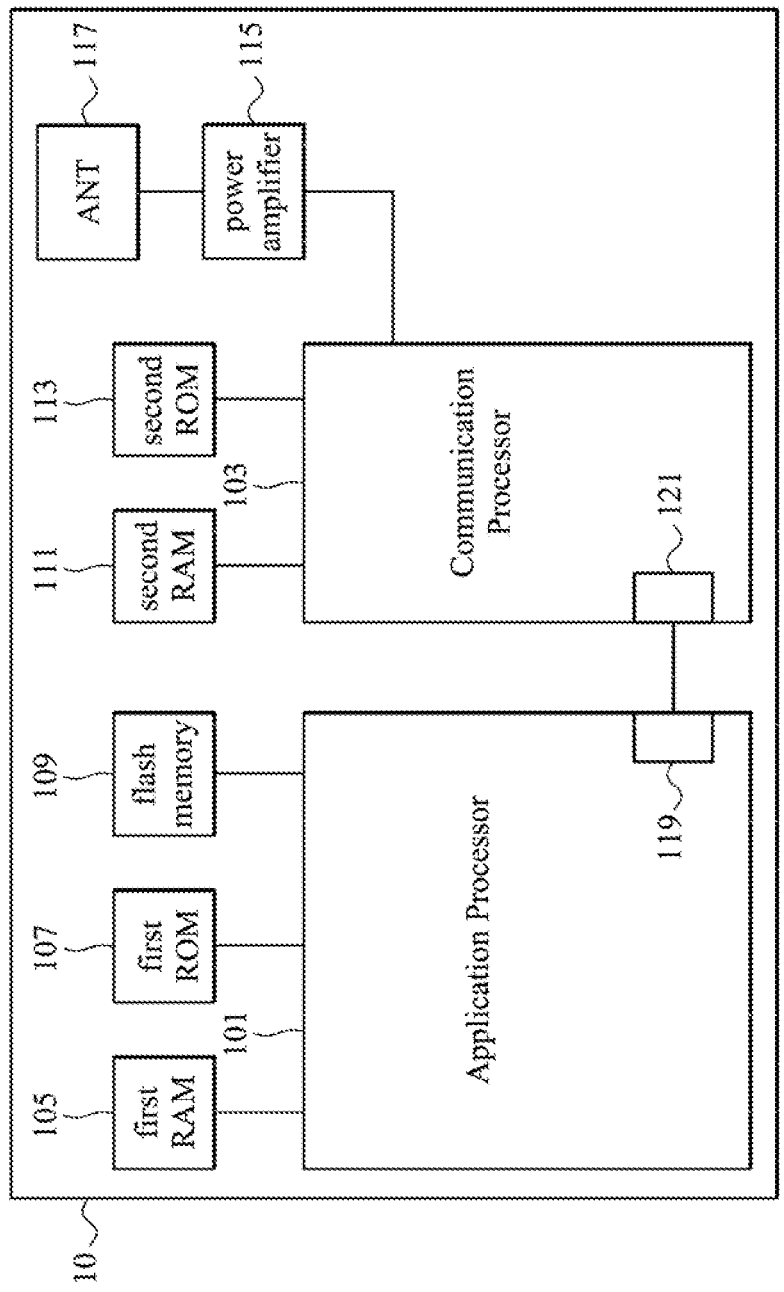
FIG. 1 is a block diagram of an embodiment of a portable device according to the invention.

FIG. 1 is a block diagram of an embodiment of a portable device according to the invention. In this disclosure, the portable device may be a smart phone, a personal digital assist (PDA), a PDA phone, a tablet or a mobile phone that includes a 3G communication processor embedded therein. The portable device 10 comprises an application processor 101 and a communication processor 103. The application processor electrically connects to a first RAM 105, a first ROM 107 and a flash memory 109. The first ROM 107 stores parameters, configurations and programs for the application processor 101. The application processor 101 stores data for operations in the first RAM. The communication processor 103 connects to a second RAM 111, a second. ROM 113 and a power amplifier 115 connecting to an antenna 117. The antenna 117 receives radio frequency signals and transmits signals or data to other devices. The power amplifier 115 controls receiving powers and transmitting powers of the antenna 117 at different frequency bands. The application processor 101 communicates with the communication processor 103 via a first interface 119 and a second interface 121. In one embodiment, the first interface 119 and the second interface 121 are high speed inter-chip (HSIC) interfaces. The communication processor 103 deals with all the tasks, processes and operations related to communications, such as 3G communication, 4G communication or 2G communication.

Figure 2:
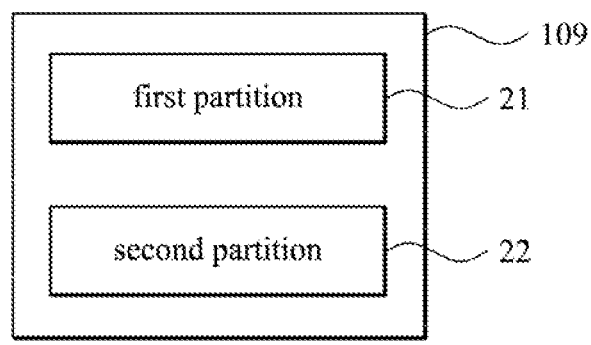
FIG. 2 is a schematic diagram of an embodiment of a flash memory according to the invention.

When the portable device 10 is turned on, the communication processor 103 loads a boot program from the second ROM 113 to the second RAM 111. The communication processor 103 executes the boot program to receive data from the application processor. The application processor 101 has two operating modes, a normal mode and a calibration mode. The calibration mode is especially for the manufacturer of the portable device 10 to execute a factory test or people having the permission right for modifying the calibration data. When the portable device 10 is turned on during a factory test, the application processor 101 operates in the calibration mode and mounts a first partition and a second partition of the flash memory, such as the first partition 21 and the second partition 22 shown in FIG. 2, wherein the first partition 21 and the second partition 22 can be read or written by the application processor during the factory test. The second partition 22 stores a radio data and a normal usage data. The radio data is the common term to present the protocol negotiation, executable binary files, modem configuration, etc. The radio data would be the same unless other different radio data is updated to the portable device 10. The normal usage data is changed or modified according to a user's telephony usage.

The first partition 21 stores a calibration data for the communication processor 103. The calibration is unique for the communication processor 103, power amplifier 115 and the antenna 117, thus no initial calibration data is stored in the first partition 21 of the flash memory 109 before the factory test is completed. The application processor 101 transmits a self-test program to the communication processor 10 and the communication 103 executes the self-test program to generate the calibration data. After the calibration data is generated, the communication processor 103 transmits the calibration data to the application processor 101, and the application processor 101 stores the calibration data in the first partition 21 and the first partition is set to be read only. The calibration data stores a plurality of parameters related to the communication process 103 and the power amplifier 115. For example, the power amplifier 105 adjusts its power at different frequency bands according to the parameters.

After the factory test, the application processor 101 is set to operate in the normal mode when the portable device 101 is turned on. When the application processor 101 operates in the normal mode, the application mounts the first partition 21 of the flash memory 109 to acquire the calibration data, and mounts the second partition 22 of the flash memory 109 to acquire the radio data and the normal usage data. Note that the first partition 21 is set to be read only and the second partition 22 is set to be read or written during the normal mode. The application processor 101 transforms the calibration data, the radio data and the normal usage data into a radio image. The radio image is then transmitted to the communication processor 103. When the communication processor 103 receives the radio image, the communication processor 103 retrieves the calibration data, the radio data and the normal usage data from the received radio image and stores the calibration data, the radio data and the normal usage data to the second RAM 111.

When the communication processor 103 operates, the normal usage data may be changed due to a user's telephony usage. Once the normal usage data stored in the second RAM 111 is modified by the communication processor 103, the communication processor 103 transmits the updated normal usage data to the application processor 101. When the application processor 101 receives updated normal usage data, the application processor 101 stores the updated normal usage data in the second partition 22 to replace the original normal usage data. In other situations, the communication Processor 103 may also transmit the normal usage data stored in the second RAM 111. For example, when the portable device 10 is about to be turned off, the communication processor 103 transmits the normal usage data currently stored in the second RAM 111 to the application processor 101.

The above paragraphs describe that the calibration data is only modified only during the factory test, but the invention is not limited thereto. The portable device 10 can be configured by engineers in an engineer mode. To enter the engineer mode, the engineer needs to enter a combination of keys or connect the portable device 10 to a specific test device. When the portable device 10 is turned on and the application processor 101 detects the specific test device or the combination of keys, the application processor 101 enters the calibration mode and the first partition 21 is configured to be read and written. The application processor 101 may transmit the self-test program to the communication processor 103 and the communication processor 103 executes the self-test program to get a new calibration data. In other embodiments, the application processor 101 receives a calibration program from the specific test device via an I/O interface of the portable device 10 and transmits the calibration program to the communication processor 103. The communication processor 103 then executes the self-test program to get the new calibration data. In other embodiments, the application processor directly receives the new calibration data from the specific test device.

Figure 3:
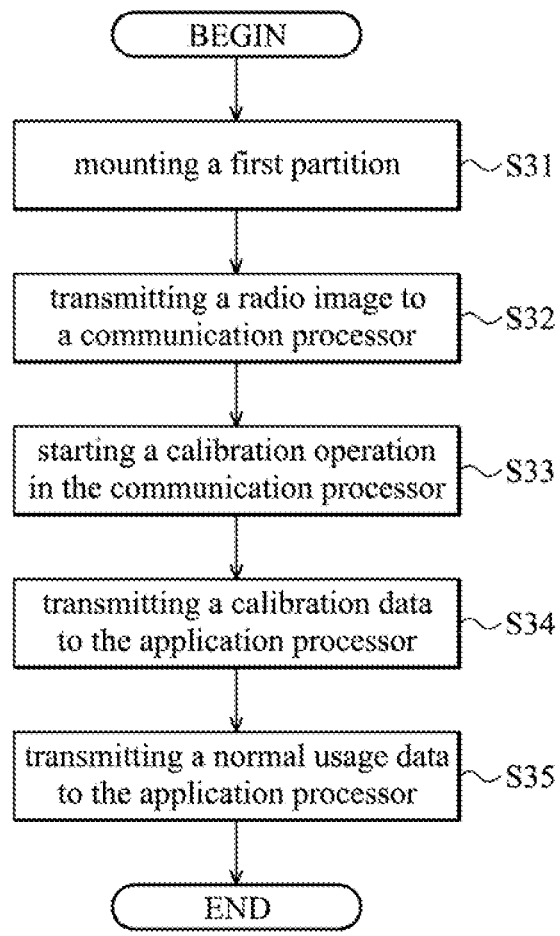
FIG. 3 is a flow chart of an embodiment of a calibration data management method in a portable device.

FIG. 3 is a flow chart of an embodiment of a calibration data management method in a portable device. The portable device comprises a communication processor and an application processor. The communication processor deals with all the tasks, processes and operations related to communication, such as 3G communication or 2G communication. The calibration data management method especially focuses on the generation of the calibration data when the portable device is manufactured. Since the calibration data is important to telephony functions of the portable device, the calibration data needs to be protected to avoid unintentionally modification or change by users. The method of FIG. 3 is only executed by the manufacturer of the portable device or people having the permission right to modify the calibration data.

In step S31, the application processor mounts a first partition of a flash memory and the first partition can be read or written by the application processor. In step S32, the application processor acquires a radio image from a second partition of the flash memory and transmits the radio image to the communication processor. The radio image comprises a radio data and a normal usage data. The radio data is the common term to present the protocol negotiation, executable binary files, modem configuration, etc. The radio data is the same unless a different radio image is updated to the mobile equipment (ME) or the portable device. The normal usage data is changed or modified according to a user's telephony usage.

Figure 4:
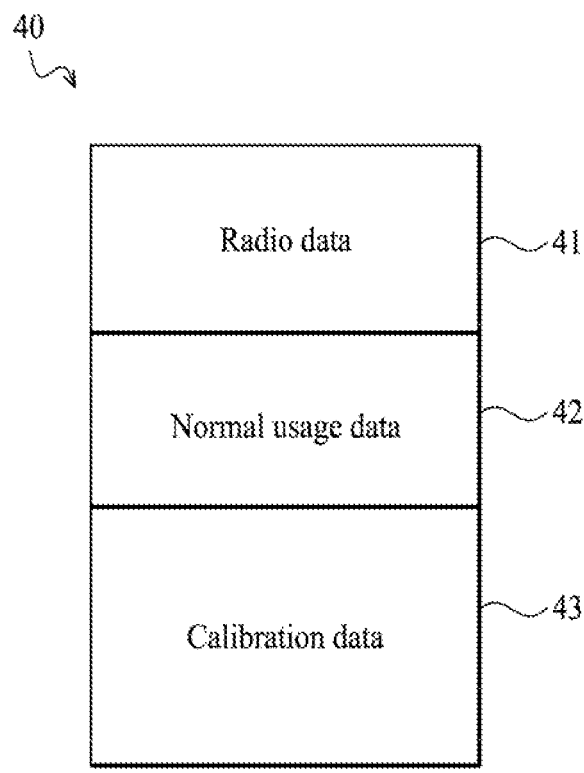
FIG. 4 shows a data structure of a radio image.

In step S32, the radio image does not contain a calibration data. In other embodiments, the radio image contains an empty calibration data. Please refer to FIG. 4. FIG. 4 shows a data structure of a radio image. The radio image 40 comprises three parts, radio data 41, normal usage data 42 and the calibration data 43. When the portable device works for the first time, no calibration data is provided an the application processor transmits only the radio data 41 and the normal usage data 42 to the communication processor. If the structure of the radio image 40 cannot be modified, it means that the application processor cannot transmit only the radio data 41 and the normal usage data 42 to the communication processor, thus, the application processor transmits the radio image 40 to the communication processor, wherein the calibration data 43 is empty or filled with dummy data.

When the communication processor receives the radio image from the application processor, a boot loader or a boot program of the communication processor transmits and stores the radio data to RAM of the communication processor, wherein the radio data comprises a calibration program that can be executed by the communication processor. The communication processor executes the calibration program to create the calibration data step S33. After finishing the calibration program, the calibration data is then transmitted to the application processor by the communication processor in the step S34. When the application processor receives the calibration data, the application processor stores the calibration data to the first partition of the flash memory and sets the first partition to be read only after data storing. In the step S35, the communication processor transmits an updated normal usage data to the application processor if the normal usage data has been modified. In this embodiment, the step S35 is executed when the calibration program is finished. In other situations, the step S35 is executed when the portable device receives a turnoff signal or a shutdown signal.

Figure 5:
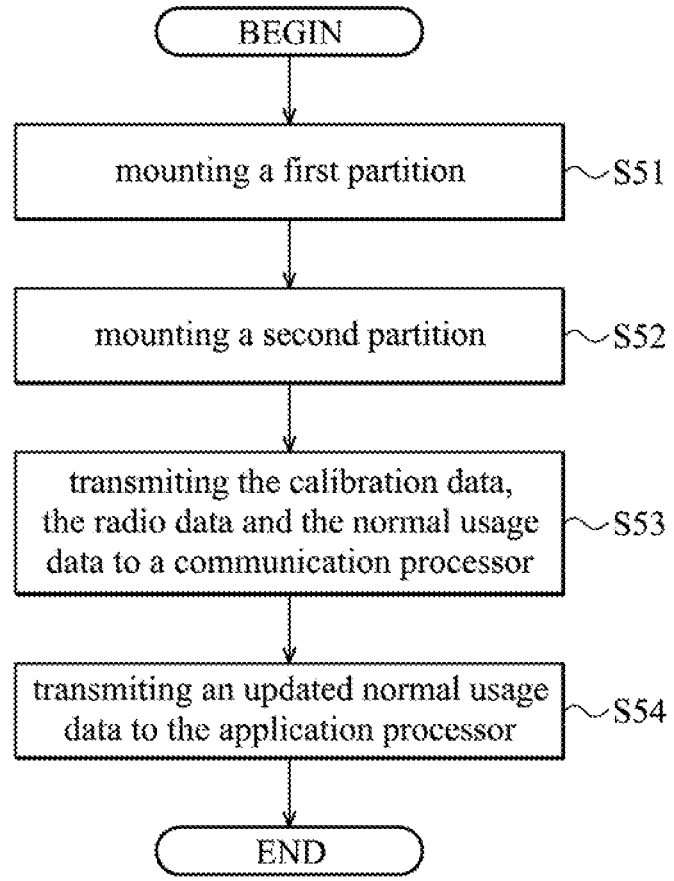
FIG. 5 is a flow chart of another embodiment of a calibration data management method in a portable device.

FIG. 5 is a flow chart of another embodiment of a calibration data management method in a portable device. The calibration data management method is executed in a normal operation for a user to prevent the user from unintentionally modifying a calibration data for a communication processor in the portable device. In step S51, an application processor mounts a first partition of a flash memory to acquire the calibration data for a communication processor, wherein the first partition can be read only by the application processor. In step S52, the application processor mounts a second partition of the flash memory to acquire a normal usage data and a radio data, wherein the second partition can be read and written by the application processor.

In step S53, the application processor transmits the calibration data, the radio data and the normal usage data to the communication processor. In other embodiments, the application processor transforms the calibration data, the radio data and the normal usage into a radio image and transmits the radio image to the communication processor. The communication processor loads a boot program from a ROM to a RAM connected to the communication processor when the portable device is turned on. When the communication processor receives the calibration data, the radio data and the normal usage data, the boot program stores the received data to the RAM and the communication processor works according to the received data. Once the communication processor modifies the normal usage data, the communication processor transmits the updated normal usage data to the application processor in the step S54. Note that the communication processor modifies only the usage data that is dynamically changed according to a user's operation.

Figure 6:
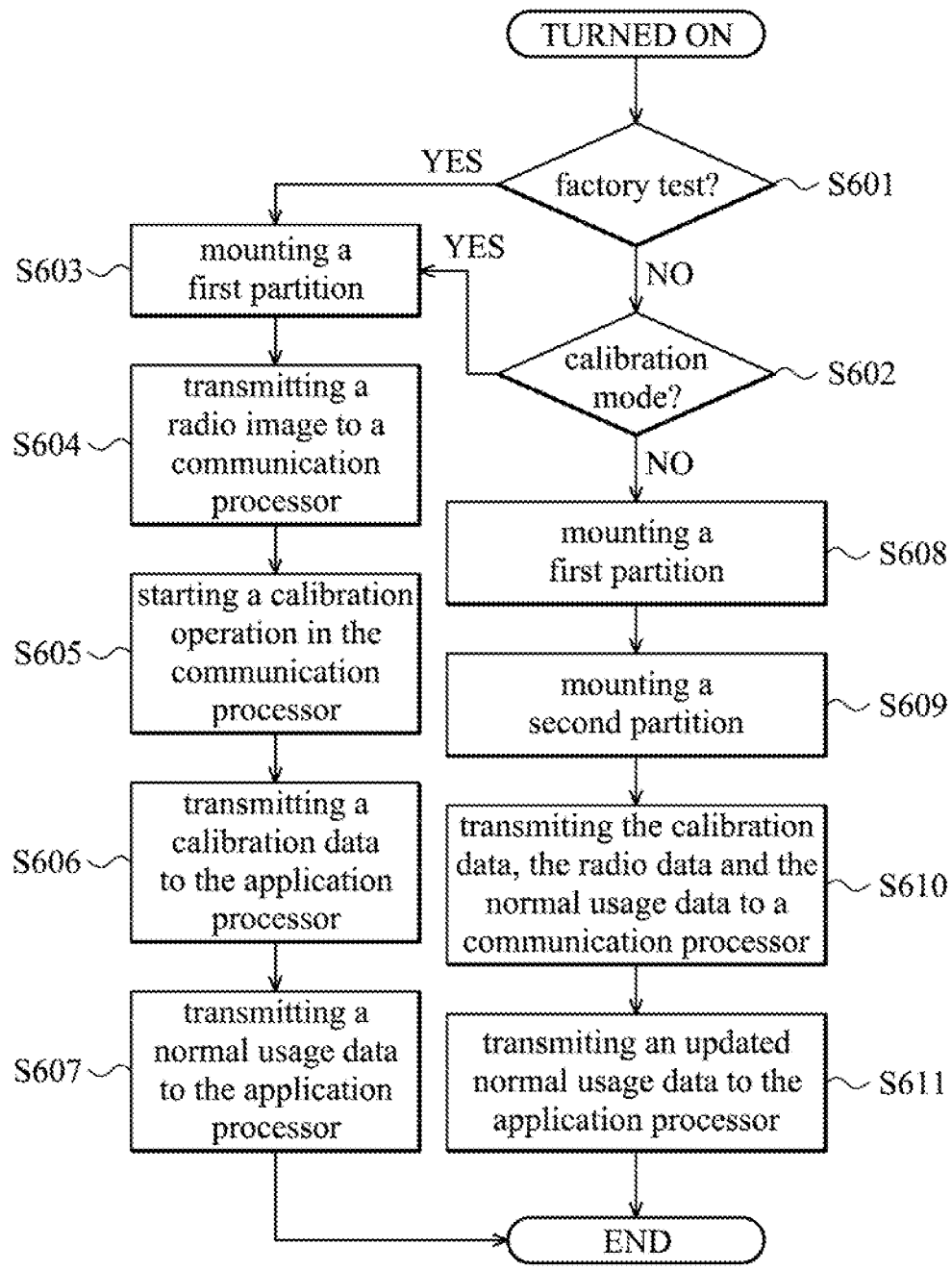
FIG. 6 is a flow chart of another embodiment of a calibration data management method in a portable device.

FIG. 6 is a flow chart of another embodiment of a calibration data management method in a portable device. When the portable device is turned on, the step S601 is executed to determine whether the portable device is under a factory test. If yes, step S603 is executed. If the portable device is not under a factory test, step S602 is executed to determine whether the portable device is under an engineer mode. If the result of step S602 is YES, step S603 is executed. If the result of the step S602 is NO, step S608 is executed.

In step S603, the application processor mounts a first partition of a flash memory an the first partition can be read or written by the application processor. In step S604, the application processor acquires a radio image from a second partition of the flash memory and transmits the radio image to the communication processor. The radio image comprises a radio data and a normal usage data. The radio data is the common term to present the protocol negotiation, executable binary files, mode configuration, etc. The radio data is the same unless the different radio image is updated to the mobile equipment (ME) or the portable device. The normal usage data is changed or modified according to a user's telephony usage.

In step S604, the radio image does not contain a calibration data. In other embodiments, the radio image contains an empty calibration data. When the communication processor receives the radio image from the application processor, a boot loader or a boot program of the communication processor transmits and stores the radio data to a RAM of the communication processor, wherein the radio data comprises a calibration program that can be executed by the communication processor. The communication processor executes the calibration program to create the calibration data in step S605. After finishing the calibration program, the calibration data is then transmitted to the application processor by the communication processor in the step S106. When the application processor receives the calibration data, the application processor stores the calibration data to the first partition of the flash memory and sets the first partition to be read only after data storing. In the step S607, the communication processor transmits an updated normal usage data to the application processor if the normal usage data has been modified. In this embodiment, the step S607 is executed when the calibration program is finished.

In step S608, the application processor mounts the first partition of a flash memory to acquire the calibration data for a communication processor, wherein the first partition can be read only by the application processor. It step S609, the application processor mounts a second partition of the flash memory to acquire a normal usage data and a radio data, wherein the second partition can be read and written by the application processor.

In step S610, the application processor transmits the calibration data, the radio data and the normal usage data to the communication processor. In other embodiments, the application processor transforms the calibration data, the radio data and the normal usage into a radio image and transmits the radio image to the communication processor. The communication processor loads a boot program from a ROM to a RAM connected to the communication processor when the portable device is turned on. When the communication processor receives the calibration data, the radio data and the normal usage data, the boot program stores the received data to the RAM and the communication processor works according to the received data. Once the communication processor modifies the normal usage data, the communication processor transmits the updated normal usage data to the application processor in the step S611. Note that the communication processor modifies only the normal usage data that is dynamically changed according to a user's operation.

Figure 7:
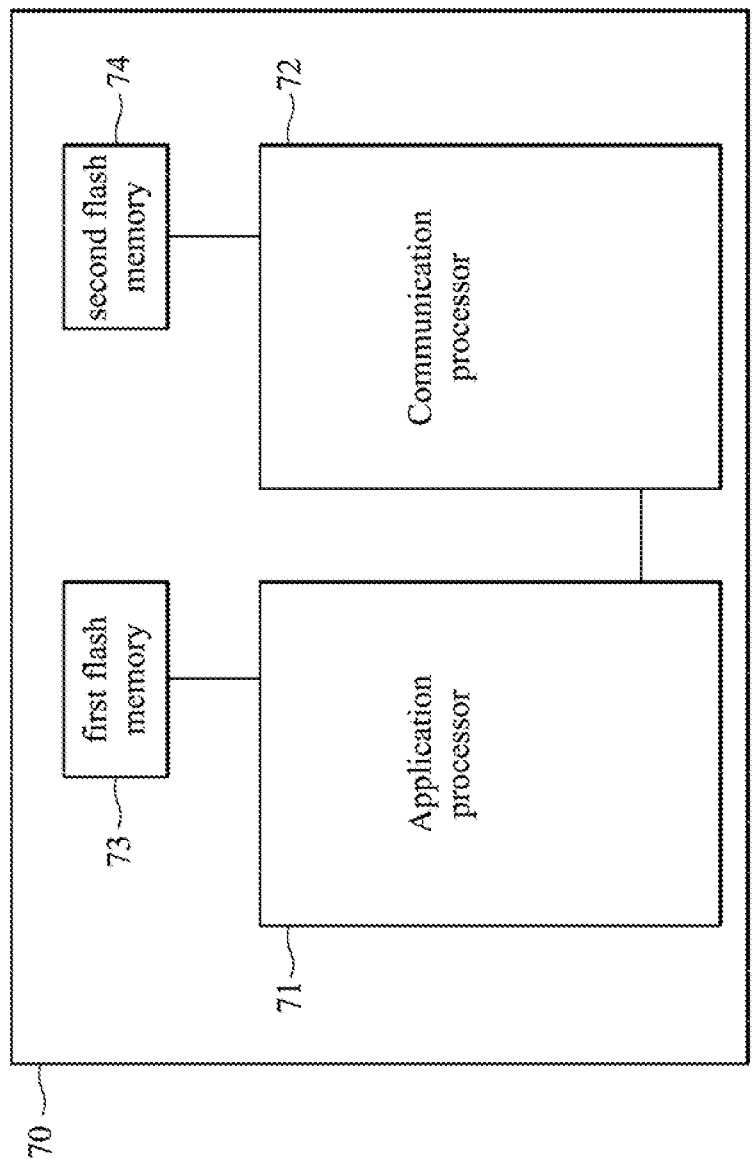
FIG. 7 is a block diagram of another embodiment of a portable device according to the invention.

FIG. 7 is a block diagram of another embodiment of a portable device according to the invention. The difference between the portable device shown in FIG. 1 and the portable device shown in FIG. 7 is that a second flash memory 74 is connected to the communication processor 72 for storing a calibration data. The following paragraphs discuss only the difference between portable device 10 shown in FIG. 1 and the portable device 70 shown in FIG. 7. The first flash memory 73 stores a radio data and a normal usage data. The radio data and the normal usage data are stored in a first partition of the first flash memory 73, and the first partition is configured to be read and written by the application processor 71 at any time.

When the portable device 70 is turned on, the application processor 71 transmits the radio data and the normal usage data to the communication processor 72. During a factory test, the application processor 71 further transmits a self-test program to the communication processor 72. The communication processor 72 executes the self-test program to generate a calibration data. The calibration data is stored in a second partition of the second flash memory 74, wherein the second partition is not writable at any time. The second partition is writable by the communication processor 72 during the factory test and an engineer mode. Reference can be made to the description of FIG. 1 for the details of the operation under the engineer mode and will not be described here for brevity.

In this embodiment, the application mode transmits a control signal to the communication processor 72 and the communication 72 determines to set the second partition of the second flash memory 74 to be read only or writable according to the control signal. The control signal may indicate an operating mode, such as a normal mode, the engineer mode or the factory test.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An operation method for a portable device including an application processor and a communication processor, comprising:
    mounting a first partition of a flash memory to the application processor, wherein calibration data are stored in the first partition and the first partition is read only for the application processor;
    mounting a second partition of the flash memory to the application processor, wherein radio data are stored in the second partition and the second partition are readable and writable for the application processor;
    transmitting the calibration data and the radio data to the communication processor by the application processor; and
    the communication processor operating according to the calibration data and the radio data.

2. The method as claimed in claim 1, wherein the application processor transforms the radio data and the calibration into a radio image and transmits the radio image to the communication processor.

3. The method as claimed in claim 1, further comprising:
    determining whether the application processor is operating under a calibration mode; and
    setting the first partition can be read and written by the application processor if the application processor is operating under the calibration mode.

4. The method as claimed in claim 3, further comprising:
    transmitting a self-test program to the communication processor by the application processor;
    executing the self-test program by the communication processor to generate updated calibration data;
    transmitting the updated calibration data to the application processor by the communication processor; and
    storing the updated calibration data to the first partition by the application processor and setting the first partition is read only by the application processor.

5. The method as claimed in claim 1, further comprising:
    determining whether the portable device is under a factory test;
    setting the first partition to be readable and writable by the application processor;
    transmitting a self-test program instead of the calibration data to the communication processor;
    executing the self-test program by the communication processor to generate initial calibration data;
    transmitting the initial calibration data to the application processor by the communication processor; and
    storing the initial calibration data to the first partition by the application processor and setting the first partition is read only by the application processor.

6. The method as claimed in claim 5, wherein when the portable device is under factory test, the calibration data is empty or filled with dummy data.

7. The method as claimed in claim 1, wherein the application processor further transmits normal usage data stored in the second partition to the communication processor.

8. The method as claimed in claim 7, wherein when the communication processor modifies the normal usage data to generate first normal usage data, the communication processor transmits the first normal usage data to the application processor, and the application processor replaces the normal usage data with the first normal usage data.

9. A portable device, comprising:
    a flash memory comprising a first partition and a second partition, wherein calibration data are stored in the first partition and radio data are stored in the second partition;
    an application processor coupled to the flash memory; and
    a communication processor connected to the application processor via a first interface; wherein
    when the portable device is turned on, the first partition and the second partition are mounted to the application processor, the first partition is read only by the application processor, the second partition are readable and writable for the application processor, the application processor transmits the calibration data and the radio data to the communication processor via the first interface, and the communication processor operates according to the calibration data and the radio data.

10. The portable device as claimed in claim 9, further comprising a power amplifier, wherein a power of the power amplifier is adjusted at different frequency bands according to the calibration data.

11. The portable device as claimed in claim 9, wherein the application processor operates at a normal mode and a calibration mode, and when the application processor operates at the calibration mode, the first partition is set to be readable and writable for the application processor.

12. The portable device as claimed in claim 11, wherein the application processor transmits a self-test program to the communication processor, the communication processor executes the self-test program to generate first calibration data and transmits the first calibration data to the application processor, and the application processor replaces the calibration data stored in the first partition with the first calibration data.

13. The portable device as claimed in claim 9, wherein when the portable device is under a factory test, the first partition is set to be readable and writable for the application processor, the application processor transmits a self-test program to the communication processor to generate an initial calibration data, and the application processor replaces the calibration with the initial calibration data.

14. The portable device as claimed in claim 13, wherein when the portable device is under factory test, the calibration data is empty or filled with dummy data.

15. The portable device as claimed in claim 13, wherein the application processor further transmits normal usage data stored in the second partition to the communication processor.

16. The portable device as claimed in claim 15, wherein when the communication processor modifies the normal usage data to generate first normal usage data, the communication processor transmits the first normal usage data to the application processor, and the application processor replaces the normal usage data with the first normal usage data.

* * * * *